US012290836B2

(12) United States Patent
Clement et al.

(10) Patent No.: US 12,290,836 B2
(45) Date of Patent: May 6, 2025

(54) METHOD OF MANUFACTURING A PANEL

(71) Applicant: Unilin, BV, Wielsbeke (BE)

(72) Inventors: Benjamin Clement, Waregem (BE); Bruno Vermeulen, Aldeneik-Maaseik (BE)

(73) Assignee: Unilin, BV, Wielsbeke (BE)

( * ) Notice: Subject to any disclaimer, the term of this patent is extended or adjusted under 35 U.S.C. 154(b) by 0 days.

(21) Appl. No.: 18/527,315

(22) Filed: Dec. 3, 2023

(65) Prior Publication Data

US 2024/0100564 A1 Mar. 28, 2024

Related U.S. Application Data

(63) Continuation of application No. 18/063,103, filed on Dec. 8, 2022, now Pat. No. 11,865,578.

(30) Foreign Application Priority Data

Dec. 22, 2021 (EP) .................................... 21217114

(51) Int. Cl.
*B05D 7/00* (2006.01)
*B05D 3/06* (2006.01)
*B44F 9/00* (2006.01)

(52) U.S. Cl.
CPC ............. *B05D 7/536* (2013.01); *B05D 3/061* (2013.01); *B05D 2203/00* (2013.01); *B44F 9/00* (2013.01)

(58) Field of Classification Search
CPC ................................ B05D 7/536; B05D 3/061
USPC ............................... 427/1, 11, 446, 452, 455
See application file for complete search history.

(56) References Cited

U.S. PATENT DOCUMENTS

2011/0117325 A1* 5/2011 Segaert .................. E04F 15/02 264/482
2011/0259241 A1* 10/2011 Sugiura .................. C08L 83/06 106/287.13
2013/0241095 A1 9/2013 Korten et al.
2015/0030817 A1 1/2015 Wiegelmann et al.

FOREIGN PATENT DOCUMENTS

EP 2943348 B1 10/2019
EP 2877296 B1 2/2020
EP 3865308 A1 8/2021
WO 2021214659 A1 10/2021

* cited by examiner

*Primary Examiner* — Hai Y Zhang
(74) *Attorney, Agent, or Firm* — Capitol City TechLaw

(57) ABSTRACT

A method is provided for manufacturing a panel. The method may involve supplying a substrate having an upper side. A layer may be provided onto the upper side. The upper side may be irradiated so as to cure at least a part of the layer by irradiation, hence forming the panel. The layer may include a liquid coating on substantially the entire upper side and a substance which is digitally printed locally on the upper side. The substance and the liquid coating may cooperate such that either (1) the coating and the substance react with each other, whereas the substance is a liquid that is printed on the upper side before the coating is applied and wherein the substance and the coating have different surface tensions, or (2) the coating is non-curable or only curable to a limited extent by the irradiation, whereas the substance makes the coating curable by the irradiation at locations where they meet each other.

18 Claims, 1 Drawing Sheet

METHOD OF MANUFACTURING A PANEL

This application is a continuation application of U.S. patent application Ser. No. 18/063,103 filed Dec. 8, 2022, the entire contents of which are incorporated herein by reference.

This application claims priority under 35 USC 119(a)-(d) from EP patent application No. 21217114.4 filed on Dec. 22, 2021, the entire contents of which are incorporated herein by reference.

BACKGROUND

1. Field

The present invention relates to a method of manufacturing a panel, comprising the steps of supplying a substrate having an upper side, applying a layer onto the upper side and subsequently irradiating the upper side so as to cure at least a part of the layer by irradiation, hence forming the panel.

2. Discussion of Related Art

Such a method of manufacturing a panel is known.

SUMMARY

An object of the invention is to provide an efficient method of manufacturing a panel for covering a floor, a wall, a ceiling or furniture.

This object is accomplished by the invention, wherein the layer comprises a liquid coating on substantially the entire upper side and a substance which is digitally printed locally on the upper side, wherein the substance and the liquid coating cooperate such that either the coating and the substance react with each other, whereas the substance is a liquid that is printed on the upper side before the coating is applied and wherein the substance and the coating have different surface tensions, or the coating is non-curable or only curable to a limited extent by the irradiation, whereas the substance makes the coating curable by the irradiation at locations where they meet each other.

An advantage of the present invention is that each of the defined options provides an efficient method to create a textured surface at the upper side of the resulting panel. Digital printing of the substance provides the opportunity to print the substance in numerous different possible patterns and to control the velocity of the printed substance. Digital printing may be performed by inkjet printing, for example.

The resulting panel may be suitable for a floor, wall or ceiling covering or alternative coverings. It may also be a panel that is suitable for furniture, or the like.

The option wherein the substance is printed as a liquid on the upper side before the coating is applied, whereas the substance and the coating have different surface tensions and react with each other, provides the opportunity to influence the surface structure of the upper surface of the coating. Due to the different surface tensions between the coating and the substance they repel each other, creating a finely textured upper surface at regions where the substance is printed, i.e. a microstructure. This results in a tactile and visual effect which distinguishes areas where the substance is printed from areas where the substance is not printed.

It is noted that variations in substance thickness and coating thickness may vary the final result of the tactile and visual effect.

The coating and the substance may cooperate with each other such that the substance penetrates or partly penetrates into the coating.

When the word 'liquid' is used herein, it may cover a wide range of viscosities. For example, a pasty material is also regarded as being a liquid.

The coating and the substance may already start to react with each other before the step of irradiating.

The substance may have a higher surface tension than the coating.

The surface tensions of the coating and the substance may be varied by selecting the chemical nature of their base raw materials and by adding specific additives. For example, resins containing polar groups as hydroxyl, amines and aromatic groups will have a surface tension higher than resins containing linear structures of hydrocarbon type. Additives reducing the surface tension may be: silicones, polyether silicones, acrylate silicones, polyether silicones acrylates, fluorinated surfactants, alkoxylated alcohols. Additives increasing the surface tension may be amines, polyethers macromers-modified polyacrylates, silicon and polyethers macromers-modified polyacrylates.

The substance may be a liquid that contains a photo crosslinking resin, for example (meth) acrylate and/or vinyl monomers and/or acrylate oligomers.

The substance may be a varnish. Varnishes serve many purposes, for example to be used as a protectant. The varnish may contain water and/or solvents to control its viscosity.

Preferably the coating is a glossy coating, such that the textured upper surface of the resulting panel at areas where the substance is applied, create a great contrast against a higher gloss. The surrounding areas of the glossy coating which do not contain the substance remain smooth and glossy, creating a tactile and visual contrast between the areas with and without the printed substance. The coating may have various chemical nature, for example a polyurethane, epoxy, photo-crosslinking, acrylated, acrylic resin or the like.

Photo-crosslinking resins have in common the fact of polymerizing and hardening thanks to the energy irradiated by ultraviolet ray devices and/or by irradiation with EB (Electron Beam) and are divided in different types based on the cross-linking mechanism: 1) radical resins, typically from vinyl monomers and acrylate resins that are divided in different subcategories: epoxy-acrylate, urethane-acrylate, polyester-acrylate, polyether-acrylate, amino-acrylate, silicon-acrylate, polyisoprene-acrylate, polybutadiene acrylate and acrylate monomers. Among the vinyl monomers can be cited N-vinyl caprolactame (NVC), acryloyl morpholine (ACMO), diethylene glycol divinyl ether (DVE-2), triethylene glycol divinyl ether (DVE-3) and mixtures thereof. 2) cationic resin such as epoxy resin, polyols and monomers such as oxetanes and vinyl ethers.

The coating may be applied by means of inkjet printing, screen printing, roller printing, spraying, curtain coating or the like. The coating and/or the substance may comprise a synthetic resin which is polymerized during the step of irradiating, more specifically via free radical polymerization. The radiation may be UV radiation, X-ray radiation, laser radiation, electron beam radiation, visible light, infrared, or the like. In case of UV radiation the coating may contain photo initiators for initiating free radical polymerization.

The option wherein the coating is non-curable or only curable to a limited extent by the irradiation, whereas the substance makes the coating curable by the irradiation at locations where they meet each other, provides the opportunity to create an upper surface at the upper side which has elevated areas at locations where the substance is printed.

The substance may comprise a photo-initiator.

The non-curable coating may be constituted by non-photo-crosslinking materials such as polyurethane, epoxy, PLASTISOL, hot-melt resins or the like.

In a particular embodiment the substance is a first substance, wherein a second substance is digitally printed locally on the upper side adjacent to the first substance, which second substance inhibits curing of the coating at locations where they meet each other such that the coating remains liquid there. In this embodiment the non-curable coating is made curable at locations where the first substance is printed, but curing is inhibited where the second substance is printed, for example by stopping propagation of radicals if the first substance contains a photo-initiator. This prevents the coating from curing beyond borders of areas where the first substance is printed, hence creating well-defined borders of cured coating.

If the first substance contains a photo-initiator, the second substance may contain polymerization inhibitors such as UV absorbers for example 2-hydroxyphenyl-benzophenones (BP), 2-(2-hydroxyphenyl)-benzotriazoles (BTZ) and 2-hydroxyphenyl-s-triazines (HPT); stereo-hindered amines (HALS) for example 2,2,6,6-tetramethyl piperidines (TMP); antioxidants (AO) for example sterically hindered phenols, secondary thioethers, phosphites, stabilizers (in-can stabilizer) for example quinone methide, radical scavengers.

The second substance may comprise a UV absorber, an electron scavenger and/or an anti-oxidant so as to inhibit propagation of radicals.

The first and second substances may be printed synchronously, which is time saving. Nevertheless, they may also be printed in successive steps.

Remaining liquid may be removed from the upper side after the step of irradiating the upper side, for example by means of a brushing device.

The substance may be printed after applying the coating on the upper side.

The substrate may be made of a wood-based material, preferably MDF or HDF, or thermoplastic, preferably vinyl, for example WPC, SPC or LVT, metal, glass, stone, ceramic, textile, non-woven fabric, polymeric composite, mineral-based material like MgO, or cement or the like. The substrate may be rigid or flexible such that the resulting panel is rigid or flexible, respectively.

The step of irradiating may comprise UV irradiating.

Before the step of applying the layer a decor may be applied on the upper side. The decor may comprise a pattern, for example imitating a wood, a stone or a cement material.

The decor may be printed directly onto the upper side, for example by means of inkjet printing. The expression ‘printed directly’ does not exclude that intermediate layers, like primers or ink receiver layers, are applied onto the upper side prior to printing the decor. The decor may be printed using water-based inks, solvent based inks, oil based inks or, preferably, UV curable inks. The decor and the substance may be printed in register. This results in a surface texture which is in register with the decor. It is possible to obtain an extremely precise synchronization of the decor and the surface texture by digital printing. Moreover, this high precision synchronization can be obtained for an increased variety of the decor, without the need of a huge stock of preformed structured sheets to be attached to the substrate.

The decor may at least be partly cured before applying the layer.

A primer, or any alternative basecoat, may be applied onto the upper side before applying the decor.

The primer may at least partly be cured before applying the decor.

The decor may be applied by means of a decorative layer which is attached to the substrate, for example a printed paper or plastic foil. It may be attached by gluing, thermal lamination or lamination, for example.

The coating may be transparent. The transparency of the coating is preferably in correspondence to the visible radiation so that a decor being present between the substrate and the coating is visible.

BRIEF DESCRIPTION OF THE DRAWINGS

The invention will hereafter be elucidated with reference to very schematic drawings showing embodiments of the invention by way of example.

DESCRIPTION OF NON-LIMITING EMBODIMENTS

Figure 1:
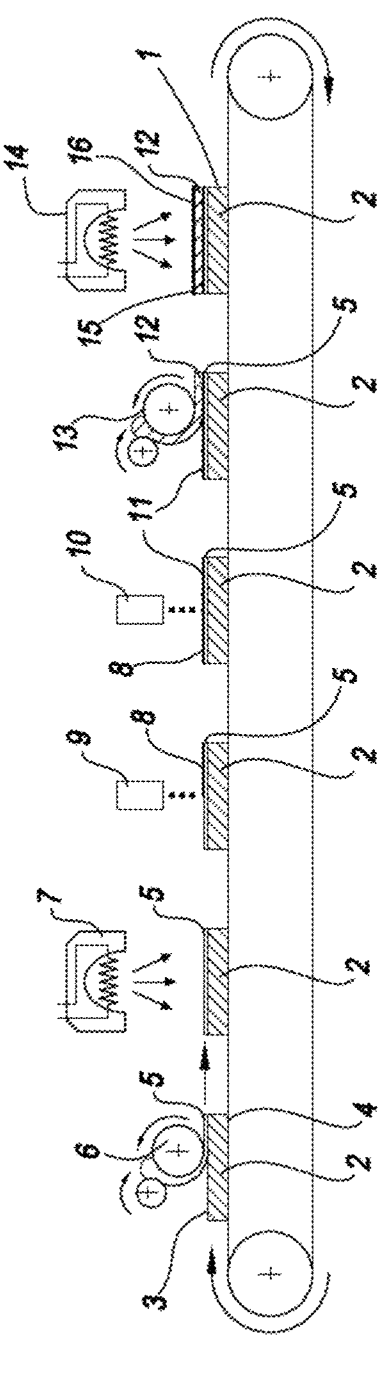
FIG. 1 is an illustrative view, showing steps of an embodiment of a method of manufacturing a panel according to invention.

FIG. 1 illustrates successive steps of an embodiment of a method of manufacturing a panel 1 according to invention. The left side of FIG. 1 shows a substrate 2 which has an upper side 3 and a lower side 4. The substrate 2 may be made of a wood-based material, a plastic-based material or mineral-based material. A primer 5 is applied on the upper side 3 by means of a roller 6. After curing the primer 5 by a curing device 7 a decor 8 is printed on the cured primer 5 by means of a digital decor printer 9. When the printed decor 8 has dried a digital varnish printer 10 prints a liquid substance in the form of a UV-curable varnish 11 at discrete areas on the upper side 3 of the substrate 2, possibly in register with the decor 8. Subsequently, a UV-curable liquid glossy coating 12 is provided on the entire upper side 3 by means of a coating device 13 such that the varnish 11, the decor 8 and the primer 5 are fully covered by the coating 12.

The varnish 11 and the coating 12 have different surface tensions such that they repel each other. Consequently, the varnish 11 does not fully spread across the upper side 3. Furthermore, the varnish 11 and the coating 12 cooperate such that they react with each other, resulting in a finely textured upper surface of the coating 12 at the areas where the varnish 11 has been printed. In a next step the upper side 3 is irradiated by means of a UV radiator 14 so as to cure the coating 12 and the varnish 11, hence forming the panel 1. The rightmost picture of FIG. 1 shows the resulting panel 1, of which the upper side 3 has glossy regions 15 and matt regions 16.

In this embodiment the coating 12 and the varnish 11 already start to react with each other before the step of irradiating. It is also possible that the reaction only occurs during the step of irradiating or that the reaction has ended before the step of irradiating. The coating 12 and the varnish 11 together form a layer which is applied on the upper side 3 of the substrate 2 before irradiating the upper side 3 so as to cure the layer. The UV radiator 14 may be provided with Hg lamps and/or LED lamps for creating photo-polymerization in the coating 12 and the varnish 11.

Figure 2:
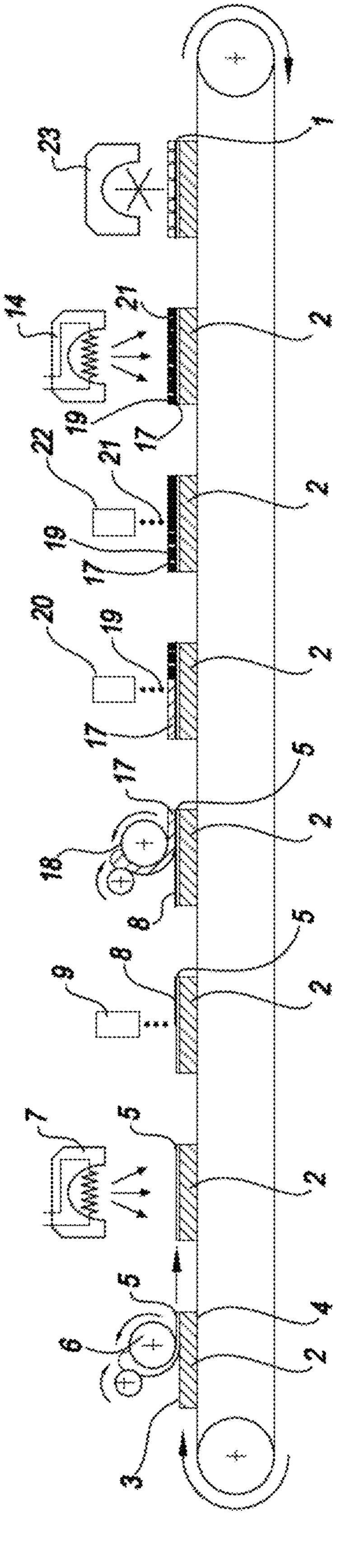
FIG. 2 is a similar view as FIG. 1, illustrating an alternative embodiment.

FIG. 2 illustrates successive steps of an alternative embodiment of a method of manufacturing a panel 1 according to the invention. The first steps are comparable to the embodiment as described hereinbefore, but when the printed decor 8 has dried a liquid coating 17 which is not curable by means of the UV radiator 14 is applied on the upper side 3 by means of a non-curable coating device 18. Subsequently, a photo initiator 19 is printed to the liquid coating 17 in register with the decor 8 by means of a photo initiator printer 20. Although FIG. 2 shows that the photo initiator 19 lies on top of the coating 17 it may also penetrate into the coating 17. The photo initiator 19 makes the coating 17 curable where they meet each other. At the same time or in a next step a UV absorber 21 is printed to the coating 17 by means of a UV absorber printer 22, in register with the decor 8. In this case the term 'in register' means that the UV absorber 21 is printed adjacent to regions where the photo initiator 19 is printed, hence adjacent regions where the decor 8 is located. It is noted that in some embodiments the UV absorber 21 and the photo initiator 19 can be printed with the same printer.

FIG. 2 shows that the UV absorber 21 is only printed within small areas adjacent to the regions where the photo initiator 19 is printed, but it is also possible to fill the entire areas where the photo initiator 19 is absent. The UV absorber 21 inhibits curing of the coating 17 at locations where they meet each other such that the coating 17 remains liquid there. By printing the UV absorber 21 adjacent to the photo initiator 19 the areas of the coating 17 that are intended to be cured can be bordered accurately since uncontrolled propagation of the curing reaction can be limited; for example, the UV absorber 21 inhibits propagation of radicals formed by the photo initiator 19. It is possible to vary the curing conditions by changing the quantity of the printed photo initiator 19, for example.

In a next step the upper side 3 is irradiated by means of the UV radiator 14 after which remaining non-curable coating 17 is removed by a mechanical device, such as a brushing machine 23. The resulting panel 1 has elevated surface areas at the printed decor 8.

The removal of non-curable or non-cured coating can also be carried out by an air jet with high pressure or by a water jet with high pressure or by using a suitable solvent, for example.

The invention is not limited to the embodiments shown in the drawings and described hereinbefore, which may be varied in different manners within the scope of the claims and their technical equivalents.

The invention is further disclosed by the following list of numbered items.

1. A method of manufacturing a panel (1), comprising the steps of supplying a substrate (2) having an upper side (3), applying a layer onto the upper side (3) and subsequently irradiating the upper side (3) so as to cure at least a part of the layer by irradiation, hence forming the panel (1), wherein the layer comprises a liquid coating (12, 17) on substantially the entire upper side (3) and a substance (11, 19, 21) which is digitally printed locally on the upper side (3), wherein the substance (11, 19, 21) and the liquid coating (12, 17, 21) cooperate such that either
   the coating (12) and the substance (11) react with each other, whereas the substance (11) is a liquid that is printed on the upper side (3) before the coating (12) is applied and wherein the substance (11) and the coating (12) have different surface tensions, or
   the coating (17) is non-curable or only curable to a limited extent by the irradiation, whereas the substance (19) makes the coating (17) curable by the irradiation at locations where they meet each other.
2. A method according to item 1, wherein the coating (12) and the substance react with each other, whereas the substance (11) is a liquid that is printed on the upper side (3) before the coating (12) is applied and the substance (11) and the coating (12) have different surface tensions.
3. A method according to item 2, wherein the coating (12) and the substance (11) already start to react with each other before the step of irradiating.
4. A method according to item 2 or 3, wherein the substance (11) has a higher surface tension than the coating (12).
5. A method according to any one of the items 2-4, wherein the substance is a varnish (11).
6. A method according to any one of the items 2-5, wherein the coating is a glossy coating (12).
7. A method according to items 1, wherein the coating (17) is non-curable or only curable to a limited extent by the irradiation, whereas the substance (19) makes the coating curable by the irradiation at locations where they meet each other.
8. A method according to items 7, wherein the substance comprises a photo-initiator (19).
9. A method according to items 7 or 8, wherein the substance is a first substance (19) and wherein a second substance (21) is digitally printed locally on the upper side (3) adjacent to the first substance (19), which second substance (21) inhibits curing of the coating (17) at locations where they meet each other such that the coating (17) remains liquid there.
10. A method according to item 9, wherein the second substance comprises a UV absorber (21), such as an electron scavenger or an anti-oxidant so as to inhibit propagation of radicals.
11. A method according to item 9 or 10, wherein the first and second substances (19, 20) are printed synchronously.
12. A method according to any one of the items 7-11, wherein remaining liquid (17) is removed from the upper side (3) after the step of irradiating the upper side (3).
13. A method according to any one of the items 7-12, wherein the substance (19) is printed after applying the coating (17) on the upper side (3).
14. A method according to any one of the preceding items, wherein the substrate (2) is made of a wood-based material, preferably MDF or HDF, or a plastic-based material, preferably PVC or PP, or mineral-based, preferably MgO, or cement.
15. A method according to any one of the preceding items, wherein the step of irradiating comprises UV irradiating (14).
16. A method according to any one of the preceding items, wherein a decor (8) is applied on the upper side (3) before the step of applying the layer (11, 12, 17, 19, 21).
17. A method according to item 16, wherein the decor (8) is printed directly onto the upper side (3).
18. A method according to item 17, wherein the decor (8) is at least partly cured before applying the layer (11, 12, 17, 19, 21).
19. A method according to any one of the items 16-18, wherein a primer (5), or any alternative basecoat, is applied onto the upper side (3) before applying the decor (8).

20. A method according to item 19, wherein the primer (5) is at least partly cured before applying the decor (8).

21. A method according to item 16, wherein the decor is applied by means of a decorative layer which is attached to the substrate, for example a printed paper or plastic foil.

22. A method according to any one of the preceding items, wherein the coating (12, 17) is transparent.

The invention claimed is:

1. A method for manufacturing a panel, the method comprising:

supplying a substrate having an upper side;

applying a layer onto the upper side; and irradiating the upper side so as to cure at least a part of the layer by irradiation, hence forming the panel;

wherein the layer includes a liquid coating on the entire upper side and a substance which is digitally printed as a liquid before the coating is applied;

wherein the substance and the liquid coating react with each other; and wherein the substance has a higher surface tension than the liquid coating; and wherein the substance comprises a photo-initiator.

2. The method according to claim 1, wherein the surface tension of the substance differs from the surface tension of the liquid coating in such a way that the substance and the liquid coating repel each other.

3. The method according to claim 2, wherein a textured upper surface is created where the substance is printed.

4. The method according to claim 1, wherein the liquid coating and the substance start to react with each other before irradiating.

5. The method according to claim 1, wherein the substance is a varnish and/or wherein the substance comprises a photo crosslinking resin.

6. The method according to claim 1, wherein the liquid coating is a glossy coating.

7. The method according to claim 1, wherein the substrate is made of a wood-based material or a plastic-based material or a mineral-based material.

8. The method according to claim 1, wherein the irradiating comprises UV irradiating.

9. The method according to claim 1, further comprising applying a décor on the upper side before applying the layer.

10. The method according to claim 9, wherein the décor is printed directly onto the upper side.

11. The method according to claim 9, wherein a primer, or an alternative basecoat, is applied onto the upper side before applying the décor.

12. The method according to claim 9, wherein the décor is applied by means of a decorative layer which is attached to the substrate.

13. The method according to claim 1, wherein the liquid coating is transparent.

14. The method according to claim 1, wherein the liquid coating comprises a non-photo-crosslinking material.

15. The method according to claim 1, wherein a décor is printed directly onto the upper side; and wherein the décor is at least partly cured before applying the layer.

16. The method according to claim 15, wherein a primer, or any alternative basecoat, is applied onto the upper side before applying the décor.

17. The method according to claim 16, wherein the primer is at least partly cured before applying the décor.

18. The method according to claim 1, wherein a décor is applied by means of a decorative layer which is attached to the substrate.

* * * * *